UNITED STATES PATENT OFFICE.

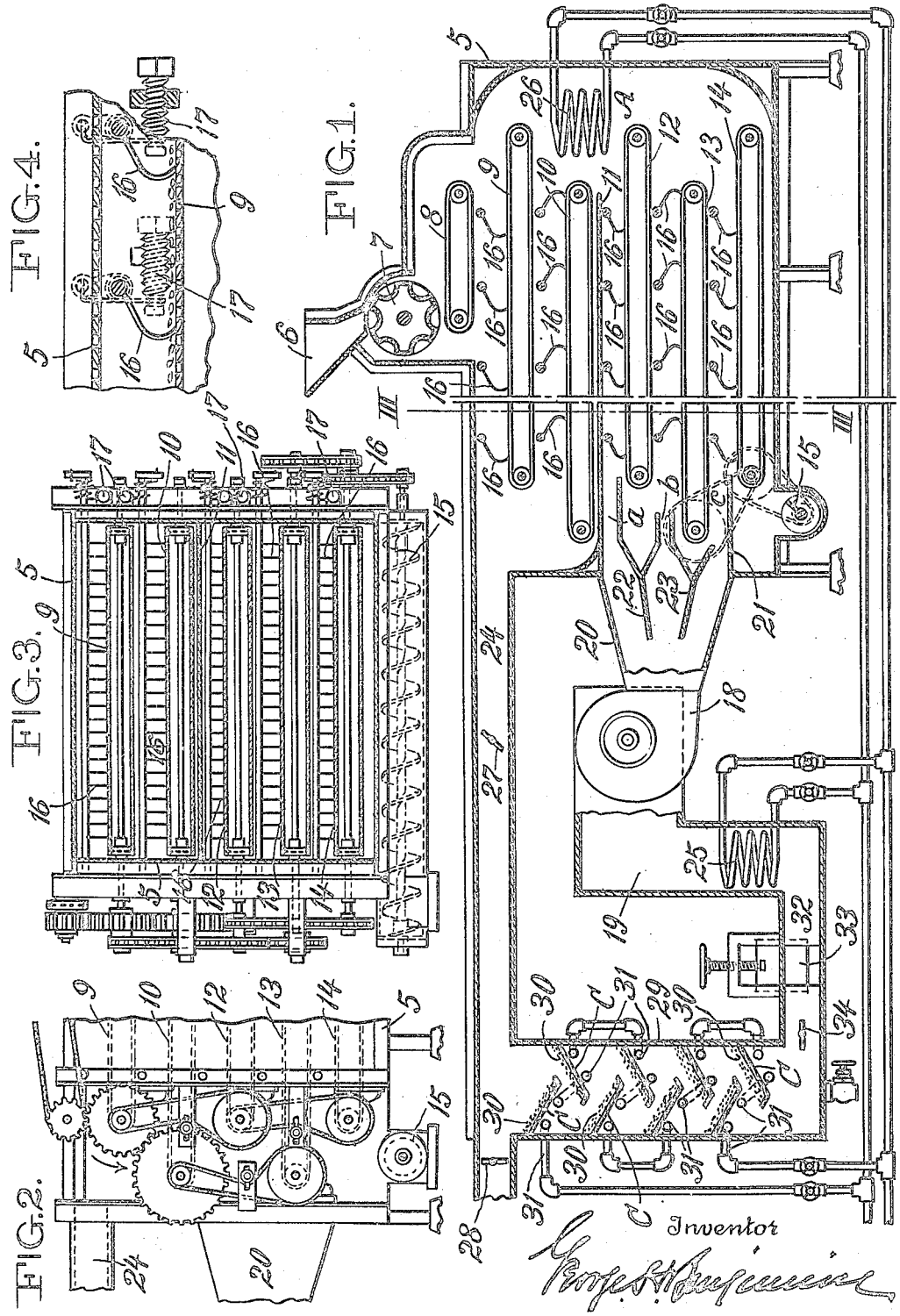

GEORGE HILLARD BENJAMIN, OF NEW YORK, N. Y.

APPARATUS FOR DRYING FRUITS, VEGETABLES, AND OTHER SUBSTANCES.

1,415,010.  Specification of Letters Patent.  Patented May 9, 1922.

Application filed February 10, 1917. Serial No. 147,778.

*To all whom it may concern:*

Be it known that I, GEORGE HILLARD BENJAMIN, a citizen of the United States, residing at New York, in the county and State of New York, have invented certain new and useful Improvements in an Apparatus for Drying Fruits, Vegetables, and Other Substances, of which the following is a specification.

My invention consists in an apparatus for drying fruits, vegetables and other substances.

In all air drying apparatus with which I am familiar the objection exists that uniform drying is not effected. This I find to be due to the fact that the heated and partially dehydrated air which is introduced into the apparatus, absorbs moisture, increases in bulk with a consequent decrease in specific gravity; the moist air moving to the top of the apparatus, with the result that the material under treatment, is not subjected to air currents of approximately the same temperature and humidity at different horizontal levels in the apparatus. Attempts have been made to overcome this difficulty, by causing the body under treatment to move progressively from the highest horizontal level in the apparatus to the lowest horizontal level, therefore passing through all of the different zones of temperature without satisfactory results, owing to the fact that the moisture-laden air occupies the highest horizontal level, and consequently the body when first introduced into the apparatus, if subjected to the action of moving air currents whose temperature is low but having a humidity higher than exists in the lowest horizontal level of the apparatus, whereas the condition should be reversed, for it is evident, that to produce the best results, the wet material when introduced into the apparatus, should be subjected to the action of air currents having the highest temperature, whereby water extraction will be rapid; and to the action of air currents having approximately the same temperature through the succeeding lower horizontal levels, with the body under treatment moved at less speed along such levels, in order to extract the proper percentage of water at each level, and finally deliver the body from the lowest level, dry, or with the percentage of humidity desired.

The above results I find can be accomplished by introducing heated air at a given temperature over the material under treatment moving over a series of horizontal parallel levels reaching from the bottom to the middle of the apparatus, and causing the air, after it is passed over the material in such horizontal levels, to be heated through a supplemental heating device to a point where the temperature of the air which will pass over the series of horizontal levels leading from the middle to the top of the apparatus, will have its temperature raised to a point where the temperature will be the same as the air introduced over the lower horizontal levels, with a slightly increased humidity, or with the temperature increased above that of the air introduced into the lower levels with the same percentage of humidity as existed between the air and the humidity introduced into the lower levels.

A further object of my invention is to provide means for circulating and purifying or revivifying the air circulated through the apparatus. It is a well recognized fact that when highly heated air is sent through a drying apparatus, and then discharged into the atmosphere, there is a large loss of heat; and further, when such air is transmitted through a body under treatment which will readily part with one or more of its volatile constituents, the air is vitiated and should be cleansed or revivified before being transmitted again over the material to be dried. My improved apparatus includes means for causing air to be transmitted, if desired, a number of times through the apparatus, and means whereby the air after it passes through the apparatus, passes through a cleansing or revivifying apparatus, to be again sent in to the apparatus over the body under treatment. The cleansing or revivifying apparatus may be constructed to extract moisture, volatile oils, carbonic or other gases, set free from the body under treatment.

I wish to have it understood that the accompanying drawings, which will serve to illustrate my invention, are largely diagrammatic, and intended merely to show the general construction of the apparatus which may be used, and the relation of its parts, without at all being confined to specific features.

Fig. 1 is a longitudinal vertical section through the whole of the apparatus employed. Fig. 2 is an elevation looking from the left of Fig. 3, illustrative of such a mechanism as may be used to drive the belts and other parts. Fig. 3, is a vertical section taken on the line III—III of Fig. 1, and Fig. 4 is an enlarged elevation and section of one of the adjusting devices looking from the left of Fig. 3.

In the drawings; 5 indicates an enclosing casing. At the top of this casing is a feed hopper 6, and below the feed hopper a distributing wheel 7. Located under the distributing wheel, is an endless distributing belt 8. Situated below the belt 8 are endless drying belts 9—10. Located under the drying belt 10 is a horizontal partition 11 situated at about the middle of the apparatus. Located under the partition 11 are the endless drying belts, 12, 13 and 14. Located at the left hand side and across the bottom of the apparatus, is a delivery worm 15. The distributing wheel 7, and belts 8, 9, 10, 12, 13 and 14, delivery worm 15, are all adapted to be driven by any suitable mechanism, such for instance as that indicated in Fig. 2 and at the lower right hand part of Fig. 3.

I do not limit myself in any wise to the character of the mechanism employed to drive the belts. I prefer, however, that the mechanism which is employed to drive belts 8, 9, 10, 12, 13 and 14, should be such that the speed of movement of the belts beginning at 9, shall be progressively decreased, and that such decrease in speed shall be proportional to the decrease of moisture of the material carried by the belts. This I find to be desirable, owing to the fact that the rapidity of evaporation of the water from the body under treatment, with a given temperature of air currents and approximately given percentage of humidity, is approximately proportional to the remaining body of water; thus, when the material is first charged on the belt 9, the belt is given a rapid movement, the water being decreased; the belt 10 is given a less rapid movement, the water being decreased, and the same is true of the succeeding belts 12, 13 and 14. The belts 8, 9, 10, 12, 13 and 14 it will be observed, are offset longitudinally, in order that one belt shall discharge on to the next lower belt.

In the drawings, I have shown the casing provided with two drying belts 9 and 10 in the upper portion of the casing, and three drying belts, 12, 13 and 14 in the lower portion of the casing. This is the arrangement (as to number of belts) which I find to be the best in practice. I wish it understood, however, that I do not limit myself to the particular number of belts shown as located in the respective portions of the casing.

In order to stir up the material under treatment as it is moved forward by the belts, I provide the spring teeth 16, which are adjustable by reason of the screws 17, located on the outside of the casing. Such adjustment I find to be desirable where the apparatus is used for treating different materials whose weight varies. The teeth act in a manner similar to those of a hay rake and are correspondingly adjustable.

Situated to the left of the casing 5 is a blower 18 the inlet of which is connected to an air trunk 19 and the outlet to an air trunk 20. The top of the air trunk 20 is formed by the partition 11, and the bottom by the partition 21, which extends over the delivery worm 15 and left hand end of belt 14. Located in the air trunk 20 and at the left of the apparatus, are two bifurcated partitions 22—23. These partitions divide the air trunk into three air channels, $a$, $b$, $c$. The air channel $a$ delivers air over the top of the belt 12; the air channel $b$ over the top of the belt 13, and the air channel $c$ over the top of the belt 14. As the body of the belts employed is formed of a perforated material (see Fig. 4), the air introduced through the channel $c$ passes upward through the belt 13 and that through the channel $b$ upward through the belt 12. The air, after passing over the belts 12, 13 and 14, passes upward through the space A between the right hand end of partition 11 and the vertical side wall of the casing 5, and then, moving in a direction from right to left, over the belts 9 and 10, into the exit air trunk 24. Located in the inlet air trunk 19, is a steam coil 25, and a corresponding steam coil 26 is located in the space A. The purpose of the steam coil 25 is to heat the air fed into the apparatus through the blower 18, and the purpose of the steam coil 26 is to heat the air passing through the space A.

It will be understood that the air introduced through the delivery trunk 20 and passing over the materials on the belts 12, 13 and 14, loses a portion of its heat and has its humidity increased; the loss of heat is due to the cooling effect of the evaporation of the moisture from the material under treatment and the increase in humidity is due to the absorbed water. It will be observed that the air introduced through the delivery trunk 20, is passed over the material under treatment after it has parted with the major portion of its moisture. Consequently, the loss of heat of the air and increase of humidity is small. The air in passing the coil 26 is heated, so that its temperature shall be that of the air fed into the air trunk 20, or it may be increased in temperature, so that the ratio of humidity to temperature in the air after passing the coil 26, is approximately the same as that fed into the apparatus through the trunk 20. Preferably the temperature of the air is increased over the temperature of the initial air introduced through the trunk 20, and for the reason that as the air after passing the coil, passes over the material under treatment on the belt 9 and 10, which carry the highest percentage of moisture, the loss of heat due to the chill through evaporation, is rapid; and therefore, to obtain the most effective moisture extracting temperature, which is approximately that delivered through the trunk 20, the temperature of the air passing over the belts 9 and 10 must be higher than that fed through the trunk 20.

It will be understood from the above statement, that the function of the coil 26 is that of a booster, and serves to lift the temperature of the air to a point where its capacity of absorbing moisture in traversing the belts 9 and 10 will be approximately that of the air traversing the belts 12, 13 and 14.

Situated in the exit trunk 24 are two dampers 27—28. The purpose of the damper 27 is to control the area of the trunk 24, and thus, if desired, set up a slight back pressure in the drying apparatus. The purpose of the damper 28 is to control the opening of the trunk 24 to the atmosphere or to any apparatus through which the air passing through the trunk may be utilized to pick up the heat carried by the air. No such apparatus is shown, but its purpose will be readily understood.

By closing the damper 28, the air after passing through the drying apparatus, is diverted to an apparatus 29 of any suitable construction, which has for its purpose to cleanse or revivify the air. I have shown an apparatus consisting of a vertical chamber 29 in which is placed a series of overlapping inclined trays C adapted to hold any suitable material 30, such for instance as lime, and such trays and material are adapted to be heated by means of steam pipes 31. The air in passing over the material 30 on the trays will be purified in accordance with the character of the material. If lime is used, the lime will absorb a certain percentage of water and $CO_2$ gas. Many apparatus and different systems have been made for purifying air. I wish it understood that I may use any of those known, for the purpose, and irrespective of whether they are designed to remove water, gases or other bodies from the air, which should be removed. The lower end of the apparatus 29 is connected to an air trunk 32, in which is a valve 33 and a damper 34. The purpose of the valve 33 is to control the admission of air to the drying apparatus. The purpose of the damper 34 is to control the passage of air into that portion of the trunk 32 leading from the cleansing apparatus 29.

The operation of my improved device is as follows: The valve 33 being open (to admit air) and the blower 18 started, steam being in coils 25 and 26, air is forced into the casing 5 and over the belts by means of the blower 18, passing out of the casing through the air exit trunk 24, the damper 27 being opened and the damper 28 closed, through the apparatus 29 and into the air trunk 32, to be delivered through trunk 19 to blower 18, the valve 33 then being closed, to cut off outside air. The action of the blower continues to circulate the air through the apparatus, the air extracting the moisture from the material under treatment as it passes over the material on the belts, and being revivified or cleansed in passing through the apparatus 29.

In practice I prefer to circulate the air until the percentage of moisture carried by the air has been increased to any percentage desired. In practice I prefer that the percentage shall be appropimately 75% of the carrying capacity of the air at the temperature employed, although it may be carried nearly to the saturation point. The damper 28 is then opened and the valve 33 closed, and the air is delivered from the apparatus. The damper 28 is then again closed and the valve 33 opened and subsequently closed, and the cycle of movement of the air repeated until final drying is effected. The material, as it leaves the lowest belt 14, passes to the delivery worm 15 to be discharged from the apparatus.

Having thus described my improved method and the apparatus which may be used, I claim:

1. In an apparatus of the class described, the combination of means for introducing heated air, means for maintaining the temperature of the body under treatment and the temperature of the air during its passage through the apparatus, and means for revivifying the air prior to its subsequent reintroduction and passage through the apparatus.

2. In an apparatus of the class described, the combination of an enclosing casing, a horizontal partition for dividing the apparatus into two sections, two series of belts longitudinally offset, one series in each section, means for driving said belts at progressively slower speeds the speeds decreasing approximately in proportion to the decrease of water in the material under treatment as the material passes from one belt to the next, together with means for driving heated air over said belts.

3. In an apparatus of the class described, the combination of an enclosing casing, a horizontal partition for dividing the apparatus into two sections, two series of moving belts longitudinally offset, one series in each section, a feed hopper and delivery wheel in the upper part of the casing, a delivery worm in the lower part of the casing, means for driving said parts, and means for causing air currents to pass over the moving belts in said casing.

4. In an apparatus of the class described, the combination of an enclosing casing, a horizontal partition for dividing the apparatus into two sections, two series of superposed belts longitudinally offset, one series in each section, means for driving the belts, a series of spring pressed adjustable teeth situated over each belt, and means for causing heated air currents to pass over said belts.

5. In an apparatus of the class described, the combination of an enclosing casing, a horizontal partition for dividing the apparatus into two sections, two series of superposed belts longitudinally offset, one series in each section, means for driving the belts, a blower, an air trunk leading from the delivery orifice of the blower and discharging over the belts in the lower section of the casing, an air exit trunk leading from the upper section of the casing and in communication with the air inlet of the blower, together with means external to the casing for heating the air introduced into the casing, and means within the casing for supplementing the heat of the air passing through the upper portion of the casing.

6. In an apparatus of the class described, the combination with moving belts of a series of adjustable agitators located over said belts.

In testimony whereof, I affix my signature, in the presence of two witnesses.

GEORGE HILLARD BENJAMIN.

Witnesses:
    HELEN E. HOELSCH,
    LESTER BEARDSLEY.